Figure 1:
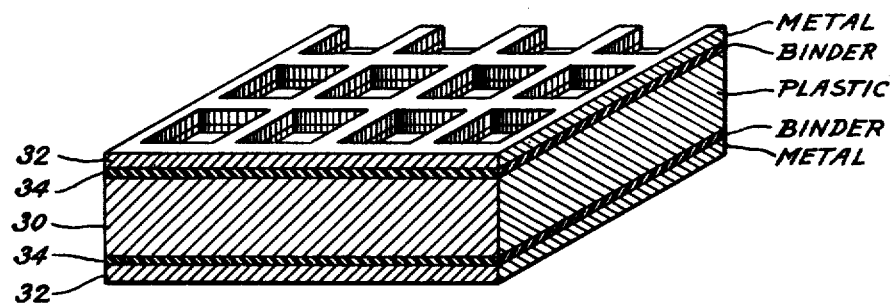

June 13, 1950  E. L. SHAW  2,511,816
LAMINATE
Original Filed Oct. 22, 1943

Inventor
ELGIN L. SHAW
By A H Oldham
Attorney

Patented June 13, 1950

2,511,816

UNITED STATES PATENT OFFICE 2,511,816

LAMINATE

Elgin L. Shaw, Cuyahoga Falls, Ohio, assignor to Goodyear Aircraft Corporation, Akron, Ohio, a corporation of Delaware Original application October 22, 1943, Serial No. 507,305. Divided and this application January 19, 1946, Serial No. 642,232

1 Claim. (Cl. 154—45.9)

This invention relates to structural laminates, and, more particularly, to laminates built up from alternate plies or layers of relatively strong metal and plies or layers of low-density, light-weight plastic or other materials.

It has been proposed heretofore to make up laminated structures to improve strength, reduce weight, and for similar or related purposes, but such prior known structures have been open to the objections that they fail structurally in service, the laminates are not adapted to shaping or forming into simple or compound curves, are expensive, and are complicated to manufacture. Furthermore, known laminates have not been readily adapted to use in conjunction with aircraft or like structures where weight is a particularly important factor and complex and compound shapes and curves are the rule rather than the exception.

It is the general object of the invention to avoid and overcome the foregoing and other difficulties of and objections to known types of laminates by the provision of a relatively inexpensive, light-weight, high-strength laminate which is relatively inexpensive to manufacture and which is particularly adapted to aircraft and related uses.

Another object of the invention is the provision of laminates of the type before and hereafter described, and the provision of improved methods for shaping the laminates into complex and compound curves and shapes.

Another object of the invention is to provide a structural laminate for aircraft and like uses and including a perforated metal surface or surfaces attached to or surrounding a layer or core of vulcanized fiber.

Another object of the invention is the provision of light-weight, but strong, structural laminations, including plies of load-bearing metal and plies or layers or low density material with the entire laminate being suitably water-proofed.

The foregoing objects of the invention, and other objects which will become apparent as the description proceeds, are achieved by the provision of a laminate comprising a load-bearing metal sheet, a body portion of at least several times the thickness of the metal sheet, and having a specific gravity appreciably less than the metal sheets, and means for securing the sheets on one or both sides of the body. The metal sheets, in one form of the invention, comprise alloy steel, such as stainless steel, and, in another embodiment of the invention, comprise aluminum alloy sheets, such as Duralumin. The body portion of the laminate may comprise vulcanized fiber, and, in the very broad aspects of the invention, other suitable plastics. Conveniently, the body portion and the metal sheets are secured together by a suitable adhesive, although any type of means may be employed to hold the laminate together.

Figure 2:
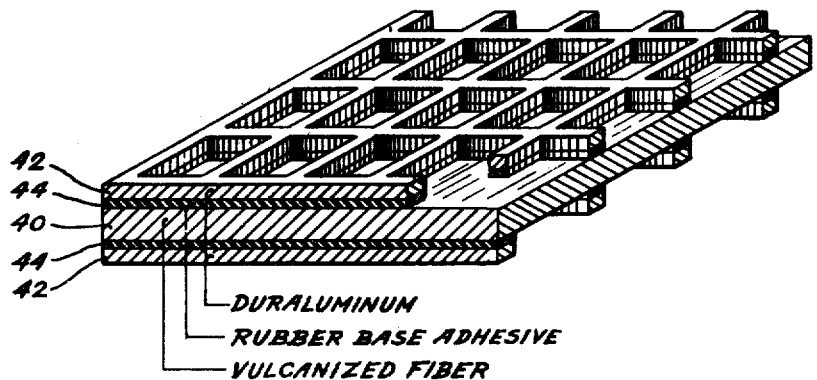

For a better understanding of the invention, reference should be had to the accompanying drawings wherein Figure 1 is a perspective view, partly in section, of one form of laminate incorporating the principles of the invention; and Figure 2 is a perspective view, partly in section, of another embodiment of the invention.

In the embodiment of the invention illustrated in Figure 1, the numeral 30 indicates generally a body portion of low-density plastic material, and particularly vulcanized fiber, which is well-known on the commercial market as being obtained by the zinc chloride treatment of paper. Secured to the body portion 30 of the laminate on one or both surfaces of the body portion is a sheets or sheets of load-bearing metal identified by the numerals 32. The metal 32 is preferably in the form of Duralumin or other aluminum alloy of high strength and light weight characteristics, but the metal sheets may take the form of a steel alloy, for example stainless steel. The metal sheets 32 are particularly characterized by being formed from an open-mesh, perforated, grilled, expanded metal, or like sheet in a manner conveniently shown in an exemplary manner in Figure 2 of the drawings. The perforations or openings in the metal sheets can be made by die perforating operations, or can be made in the usual expanded metal grid-forming method. Further, the sheets may take the form of wire screen or mesh of appropriate load-bearing character. The extent and position of the perforations or meshes in the sheets 32 will be controlled, of course, by the particular use to which the laminate is to be put.

The sheets 32 are secured to the body portion 30 by any suitable means, but preferably by an adhesive 34, such as a rubber base adhesive, for example that described in Patent No. 2,376,854, and sold by the Chrysler Corporation or the Goodyear Tire and Rubber Company under the trade-mark "Cycleweld." Fastening means such as bolts or rivets may be used but are ordinarily not preferred.

The form of the invention illustrated in Figure 2 is quite similar to that of Figure 1, except that the body portion 40 of the laminate has been definitely indicated as being vulcanized fiber, the load-bearing sheets 42 are shown to be Duralumin, with the assembly being secured together by a rubber base adhesive 44. In using an adhesive to secure the metal sheets to the vulcanized fiber, it is advisable, when the laminate is to be subsequently treated with water, to apply the adhesive, prior to laminating, only to the metal sheets, so that the fiber is not covered with adhesive in the perforation openings of the metal sheets. In this form of the invention, like that of Figure 1, the specific gravity of the body portion is appreciably less than that of the sheets, and the body portion is at least several times the thickness of a sheet.

A particular advantage of the laminate structures of Figures 1 and 2 is that even after the laminate is fully secured together, it is possible to form or shape the laminate to relatively intricate shapes or compound curves, and this can be facilitated by wetting the laminate through the openings in the metal sheets. This is partly dependent upon the body portions 30 and 40 of the laminates being of vulcanized fiber which has a relatively high affinity to water and which can be more readily formed after being wet. If it is advisable to avoid the entrapment of moisture or the absorption thereof into the laminate, either before or after shaping the laminate, the laminate may be water-proofed by dipping it into or coating it with a water-proofing material such as paraffin, varnish, or organic lacquer. Of course, ordinarily the laminate is not water-proofed before shaping unless only minor change in shape is necessary. When considerable change in shape is required, the fiber of the laminate is wet, usually through the metal perforations, the laminate is shaped, dried, and then is water-proofed if water-proofing is advisable.

From the foregoing it will be recognized that the various objects of the invention has been achieved by the provision of relatively inexpensive, light-weight, strong laminates characterized by high structural stability, and by the placing of load-bearing metals in load-bearing planes separated by low-density, light-weight body or filler materials. Laminates constructed in accordance with the invention have been found to be particularly adapted for aircraft use in the formation of skins, coverings of all sorts, and even in frame and other structural members, particularly those subjected to bending moments. Elastic stability is high, notably where sectional areas are small and compression loads have heretofore resulted in stability failure.

This application is a division of my co-pending application, now abandoned, Serial No. 507,305, filed October 22, 1943, under the title "Structural laminate."

While, in accordance with the patent statutes, the invention has been specifically illustrated and described, it should be particularly understood that the invention is not to be limited thereto or thereby, but that the scope of the invention is defined in the appended claim.

I claim.

A light-weight, high strength laminate usable for load-bearing structural purposes, said laminate including grill-shaped top and bottom metal sheets, a solid vulcanized fiber core of at least several times the thickness of the sheets, a rubber-base adhesive securing the sheets to the core, said adhesive lying only between the solid portion of the sheets and the core, the portions of the core opposite to the grill openings in the sheets being exposed whereby the core can be softened with water to facilitate bending operations on the laminate which do not destroy the bond between the core and the sheets of the laminate.

ELGIN L. SHAW.

REFERENCES CITED

The following references are of record in the file of this patent:

UNITED STATES PATENTS

| Number | Name | Date |
|---|---|---|
| 570,391 | Fox | Oct. 27, 1896 |
| 925,128 | McGuire | June 15, 1909 |
| 1,609,222 | Taylor | Nov. 30, 1926 |
| 1,822,987 | Cooper | Sept. 15, 1931 |
| 1,872,482 | Messing | Aug. 16, 1932 |
| 1,974,465 | Lewis | Sept. 25, 1934 |
| 2,237,623 | Ledwinka | Apr. 8, 1941 |
| 2,254,152 | Klemm | Aug. 26, 1941 |
| 2,306,295 | Casto | Dec. 22, 1942 |
| 2,376,854 | Saunders et al. | May 22, 1945 |
| 2,415,881 | Heftler | Feb. 18, 1947 |